May 26, 1931.     A. JOFFE     1,807,292
TRANSLATING DEVICE
Filed Feb. 15, 1927
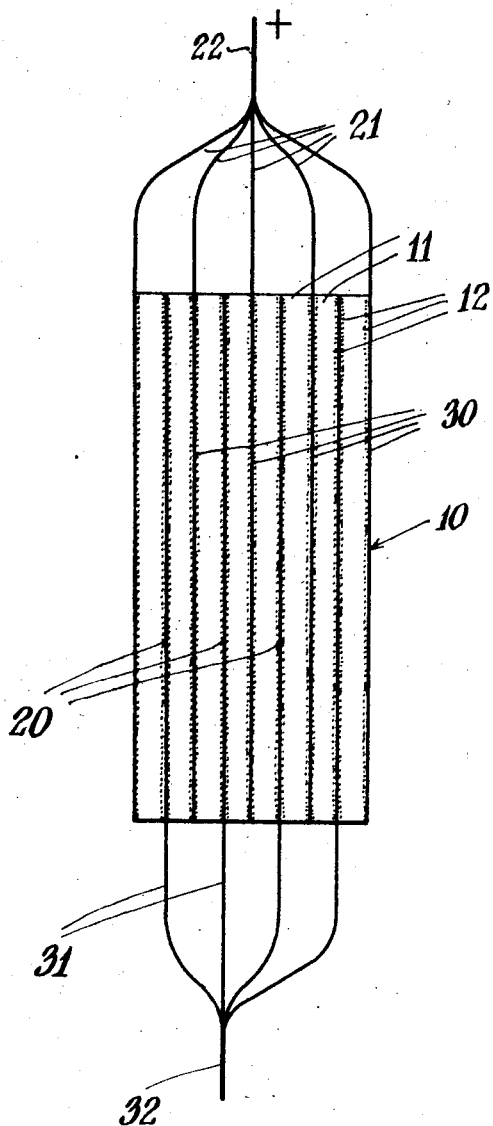

Patented May 26, 1931

1,807,292

UNITED STATES PATENT OFFICE

ABRAHAM JOFFÉ, OF LENINGRAD, UNION OF SOCIALIST SOVIET REPUBLICS, ASSIGNOR TO INDUSTRIAL RESEARCH COMPANY, OF CAMBRIDGE, MASSACHUSETTS, A CORPORATION OF MASSACHUSETTS

TRANSLATING DEVICE

Application filed February 15, 1927, Serial No. 168,450, and in Germany August 3, 1926.

My present invention relates to devices for converting electrical into non-electrical, such as mechanical, energy and the like, and vice versa, and aims to devise articles of the general character specified which, by the utilization of certain novel dielectric substances and bodies made of the same, permit high potential gradients to be utilized in such dielectric bodies and consequently very high pressures and correspondingly substantial mechanical effects to be obtained in accordance with the principle known as the "piezo" effect, the reverse operation of converting mechanical or other non-electrical energy into electrical energy making use of the same devices and the same electro-mechanical principles.

It is an object of the present invention to devise devices of the general character specified above which are simple in construction, which may be readily and economically fabricated and assembled, and by means of which in a simple and highly effective manner the desired conversion of one form of energy into another may be accomplished. In its more specific aspects, the present invention aims to devise articles by which electrical energy may be converted into mechanical energy for the operation of relays, loud speakers for radio and like purposes, and devices for converting electrical into vibratory, such as audible, impulses, as for the transmission of signals under water. Other objects and purposes of the present invention will in part be pointed out in detail hereinafter and will in part be obvious to those skilled in the art to which the present invention relates.

In the accompanying specification I shall describe, and in the annexed drawing more or less diagrammatically illustrate, an illustrative embodiment of the present invention, particularly one for converting electrical into non-electrical, as mechanical, energy. It is, however, to be clearly understood that my invention is not limited to the specific embodiment thereof herein shown and described for purposes of illustration merely. It is furthermore to be clearly understood that the specific character of the dielectric substances and dielectric bodies made of the same which may be utilized in the devices of the present invention is more fully described and is fully claimed in a copending simultaneously filed application of mine Serial No. 168,448 entitled "Dielectric substances, insulators and the like".

Referring to the drawing, wherein I have more or less diagrammatically illustrated an embodiment of the present invention utilizing the principles of the same, the single figure of the drawing shows in edge view a device for converting electrical into non-electrical, as mechanical energy, as for the operation of a relay, for example.

Before describing the aforesaid illustrative embodiment of the present invention and principles involves in the same, it may be desirable briefly to refer to the prior state of the art relating to the field of the present invention, particularly with reference to the so-called "piezo" effect, by means of which it is found that the attractive force between the opposite poles or electrodes of a source of electric potential causes a certain pressure on the intervening dielectric. The attraction F between the opposite poles or electrodes of a such source of electric potential may be given as the product of the dielectric constant E of the dielectric employed and the square of the impressed potential gradient $\overline{X}$, divided by $8\pi$, according to a formula which is as follows:

$$F = \frac{E \cdot X_a \cdot \overline{X}}{8\pi} = \frac{E \cdot \overline{X}^2}{8\pi}$$

where $X_a$ is the field on the attracted electrode and $\overline{X}$ the average field. In other words, the force of attraction between the opposite poles or electrodes of such a source of electric potential is proportional to the square of the potential gradient.

Now with ordinary insulators, a potential gradient of about 200,000 volts per centimeter is about the maximum obtainable. With this potential gradient there is a pressure on the dielectric, due to the dielectric stress, of approximately one-tenth of an atmosphere. If the potential gradient be increased to about 1,000,000 volts per centimeter, the pressure rises to 2.5 atmospheres, which is a substantial, measurable effect, as distinguished from the practically negligible effect which was hitherto the maximum available with the maximum potential gradients hitherto obtainable. Since the pressure, which is a measure of the mechanical effect, varies and the square of the potential gradient, with higher gradients even than 1,000,000 volts per centimeter, pressures and equivalent mechanical effects are obtainable which render such effects capable of practical application.

Referring now to the aforesaid illustrative embodiment of the present invention, and more particularly to the drawing illustrating the same, I employ for my dielectric any suitable dielectric material made up of a plurality of layers of a thickness of an order of about one micron, as of a thickness of less than about five microns, generally between about .2 micron and about five microns. This thickness corresponds to the order of the average distance an ion must travel to cause ionization by impact, for I have discovered that the breakdown of a dielectric is apparently due to a species of ionization by impact and that if such ionization can be avoided or kept within moderate limits, breakdown will be avoided. With layers of dielectric of such critical thicknesses, it will be found that the breakdown potential is independent of the thickness of the layer within this range of thickness and that the breakdown potential gradient is inversely proportional to the thickness of the layers of the dielectric within this range of thickness.

For example, assuming a total thickness for the ordinary unlaminated insulator or for an ordinary laminated insulator where the laminations of the dielectric are outside of the critical range of thickness given above, that is, are thicker than five microns each, the breakdown potential $V_b$ will, for such given thickness, be constant, that is, independent of the thickness of the layers or laminations making up such insulator of the given total thickness of D, and will be equal to the breakdown gradient $E_b$ multiplied by the thickness D, according to a formula which is as follows:

$$V_b = E_b . D.$$

On the other hand, where the thickness of the laminations making up the laminated dielectric according to the principles of the present invention is within the critical range of thickness, that is, is less than about five microns, that is, is of an order of about one micron, as by being one or two microns thick, and assuming that the thickness is greater than .2 micron, the breakdown potential $V_b$ is equal to the number $n$ of layers having a total thickness D within such critical range of thickness of the layers, multiplied by the breakdown potential $V_o$ of a single layer, such breakdown potential, as already stated, being independent of the thickness $d$ of the layer within such critical range of thickness, a relation which may be expressed by the following series of formulas:

$$V_b = n.V_o = \frac{D}{d}.V_o$$

Where the thickness $d$ of the layer is .2 micron, or less, the breakdown potential $V_b$ is independent of the thickness and equals a certain maximum corresponding to a maximum breakdown gradient according to the following formula in which D equals the total thickness of the layers having a thickness of .2 micron or less:

$$V_b = n.E_{mat}.d = E_{mat}.D.$$

Accordingly by making the thickness $d$ of the layers thin enough, and taking care that the ions produced in any one layer will not be admitted to the next layer of the dielectric so as to cause cumulative ionization, which result may be brought about by the use of separators, as of very thin metal, or of using a dielectric of relatively good conductivity, as one having a specific conductivity several times, as ten times, the specific conductivity of the dielectric, or by using a different dielectric having a thickness within the critical range of thickness given above, tremendously high potential gradients may be obtained corresponding to tremendously high pressures and correspondingly high mechanical effects.

For example, using a potential gradient of $10^8$ volts per centimeter, the pressure, according to the formula given above, rises to the enormous amount of 25,000 atmospheres. At potential gradients equalling $1.5 \times 10^8$ volts per centimeter, which I have actually attained in certain cases, the pressure rises to the enormous amount of 60,000 atmospheres.

At a pressure of 40,000 atmospheres, the compression in the dimension across which the pressure exists, will, in the case of mica or glass, amount to about 3%. With other materials of greater volume compressibility, such as the linseed oil varnish dielectrics described later in this specification, this amount is considerably larger. Hence, a block of dielectric material constructed in accordance with the principles of the present invention and operated under the dielectric stresses attainable under the conditions set forth above, may be expected to change its thickness by a factor of at least 3%.

A block one centimeter thick will, therefore, if constructed in accordance with the principles of the present invention, change its dimensions about three-tenths of a millimeter upon the application of the required voltage.

Such a movement may be employed to operate a loud speaker, for example. It is also sufficient to enable it to be used for relay purposes and for the transmission of audible signals under water, for example.

It is not necessary that the entire voltage be placed on the block of material. Nor is it necessary that the voltage required to be placed on such a block of this material be greater than the voltage which may be supported by a single thin layer having a thickness within the critical range of thickness set forth above. This is for the reason that where conducting layers of thin metal or the like are positioned between the layers of the dielectric, alternate separators may be connected to one of the two opposite sides of the supply circuit. The dielectric films would, therefore, be thus subjected to the required dielectric stress in parallel.

At from about two or three to about five thousand volts, therefore, a one centimeter block may be made to operate a relay, loud speaker or device for transmitting audible signals under water, for example. Where such a device is to be used in a loud speaker, it is desirable to place a constant potential on the block and superimpose the voltage from the source of voice currents so that deflection would always be in the direction of the applied alternating current potential. By making the direct current potential high compared with the alternating current potential it will give a much larger and practically linear response to the applied alternating current potential.

Referring now more particularly to the type of linseed oil varnish dielectric which I have found very useful for the purposes of the present invention, I take pure linseed oil and polymerize the same at a temperature of about 300° C. for about two hours in the absence of air. I then add to the polymerized linseed oil a suitable siccative, for example, the nickel or manganese salt, preferably the manganese salt, of the characteristic organic acid of which linseed oil is the glyceride. The film of linseed oil itself may be from about ten to about twenty or more microns thick, since it is not the total thickness of the film itself but the thickness of the oxidized portions of the same which must be kept within the critical range of thickness set forth above. Such a film may be supported on a thin strip of steel or other suitable support from which it may afterwards be stripped, if desired.

Either or both surfaces, preferably both surfaces, of the linseed oil film thus prepared are superficially oxidized to a depth which will be within the critical values set forth above, that is, between about .2 micron and about 5 microns. This superficial oxidation appears to be facilitated and rendered possible by the presence of the siccative which, apparently by a sort of diffusion action, renders possible the rapid superficial oxidation of the layer of linseed oil without any substantial oxidation of the interior portions of such layer. Such interior portions, therefore, retain a substantial conductivity which is many times, apparently more than ten times, the specific conductivity of the oxidized superficial portions of the film.

The oxidizing action is preferably continued for about ten minutes in the presence of air or some other suitable oxidizing medium of about 160° C. after which time the exposed surface or surfaces of the film, if both surfaces are exposed, as is preferably the case, will be found to be oxidized to the desired thickness about one micron, in which oxidized layer or layers substantially all of the voltage drop will take place when the film is subjected to an electric potential. Where both surfaces of the film are oxidized to a depth the critical values given above, the breakdown potential of the resulting film having both surfaces so oxidized will be twice that of the film of the same dimensions having only one surface oxidized. Since, for the purposes of the present invention, I desire to provide a dielectric which will stand as high voltage gradients as possible so as to produce the maximum pressures and the maximum mechanical effects, I prefer to oxidize both surfaces of the films in the manner set forth above. The methods and means which may be successfully employed for preparing such superficially oxidized films are more fully disclosed and are fully claimed in my copending simultaneously filed application referred to above.

In the single figure of the drawing 10 indicates an energy-conversion device embodying the principles of the present invention and including in its construction a plurality of, here shown as eight, layers or films 11 each of the surfaces 12 of each of which films is superficially oxidized to a depth of an order of about one micron and within the critical range of thickness from about .2 micron to about five microns. I interpose between successive films 11 alternate metal connectors in the form of thin plates or sheets 20 and 30, respectively. The plates or sheets 20, of which five are here shown, have the upper portions 21 of the same brought together to form a pole or electrode 22 which may be connected with one pole of a source of high potential direct, pulsating or alternating current. The upper portions 31 of the plates or sheets 30 are brought together to form a pole or electrode 32 which is connected with the other pole of the source of high potential direct, pulsating or alternating current.

It is, of course, to be understood that the number of films 11 may be increased indefinitely requiring in each case the proper number of metal separators or connectors 20 and 30, and that the films 11 are preferably made quite thin, as of an order of ten microns, while the oxidized surface portions 12 of the same are each of an order of about one micron. The thickness of the separators 20 and 30 is preferably of an order of about one micron, as where such plates or sheets are made of the steel foil, about one micron thick, now on the market and manufactured in Sweden. On the other hand, other and better conducting metals, such as brass or copper, may be used for the separators or connectors 20 and 30. Increasing the number of films 20, their dimensions and dielectric characteristics remaining the same, and using the parallel arrangement of voltage distribution illustrated in the drawing, the desired mechanical effect may be increased in proportion to the number of such films, until a degree of mechanical effect is obtained suitable for the purpose for which the same is to be employed.

It may here be stated that where the impressed voltage is from a source of alternating current, there will be a mechanical effect in the nature of a vibration corresponding in frequency to the frequency of the impressed alternating current. As already indicated, by impressing on the device a direct current potential which is relatively high as compared with an impressed alternating current potential, the characteristics of which are modified by a suitable wave impulse, as speech, the device will give a vibration which will be a substantially linear response or function of the applied alternating current potential which fluctuates with the impressed speech or other wave impulse.

On the other hand, the source of applied potential may be from a direct current, in which case, on closing the circuit, a fixed mechanical effect will be produced in one direction, and on breaking the circuit the mechanical effect will be terminated. Where the reverse mechanical effect is desired to be obtained, namely, where it is desired to convert mechanical energy, as in the nature of a vibratory effect, into electrical current, for the sending of signals and the like, by impressing a direct current potential on the two poles of the device, and thereafter subjecting the device to successive compressions and releases of compressions at any desired frequencies or intervals, there will be fluctuations in the potential at the poles of the device corresponding to these variations in the mchanical pressure exerted on the device. The variations in potential at the poles will be a function of the change in the thickness of the dielectrics.

This completes the description of the aforesaid illustrative embodiment of the present invention. It will be apparent that the principles of the present invention may be utilized in many forms and in many embodiments of the same. In each case use is made of the properties of the dielectric having thicknesses within the critical range of thickness set forth above. Where linseed oil varnish is utilized which is superficially oxidized, layers of the dielectric of the desired thickness may be readily made. In fact, it is possible to provide a single thin film of the linseed oil varnish with two layers of dielectric having the desired thicknesses, one at each surface of the film. The linseed oil varnish is furthermore very desirable for the purposes of the present invention since it is characterized by high volume compressibility, which will correspond to relatively high mechanical effects, and vice versa.

The device may be used either for converting electrical into non-electrical, as mechanical, energy, or for converting non-electrical, such as mechanical, energy into electrical energy. In any such case the high voltage gradients possible with the devices of the present invention permit a correspondingly high mechanical effect by pressure to be produced, the attraction between the electrodes, corresponding to the pressure or mechanical effect on the intervening dielectric, being proportional to the square of the potential gradient.

By distributing the potential gradient in parallel, as by means of a plurality of sets of interposed metallic or other good conducting plates or sheets, a unit of the desired size for producing a substantial pressure or mechanical effect may readily be built up which is adapted to be used at moderate voltages of from about three to about five thousand volts. Other advantages and superiorities of the energy-conversion devices of the present invention will readily occur to those skilled in the art to which the same relates.

What I claim as my invention is:

1. A device for converting electrical into non-electrical energy, and vice versa, comprising a dielectric body made up of a plurality of layers of dielectric material, each such layer of dielectric material being of a thickness of between about .2 micron and about 5 microns.

2. An energy-conversion device comprising a plurality of layers of dielectric material of a thickness of an order of about one micron and intervening layers of metal.

3. An energy-conversion device comprising a plurality of layers of oxidized linseed oil of a thickness of an order of about one micron and intervening layers of metal.

4. An energy-conversion device comprising a plurality of layers of oxidized linseed oil of a thickness of from about .2 micron to about five microns and intervening layers of metal.

5. An energy-conversion device comprising a plurality of layers of oxidized linseed oil of a thickness of an order of about one micron and intervening layers of metal, alternate ones of said layers of metal being connected to each other.

6. An energy-conversion device comprising a plurality of layers of dielectric material of a thickness of an order of about one micron and intervening layers of metal, alternate ones of said layers of metal being connected to each other.

7. An energy-conversion device comprising a plurality of layers of linseed oil varnish each surface of which is superficially oxidized to a thickness of from about .2 micron to about five microns and intervening layers of metal.

8. An energy-conversion device comprising a plurality of layers of linseed oil varnish each surface of which is superficially oxidized to a thickness of less than about five microns and intervening layers of metal, alternate ones of said layers of metal being connected to each other.

9. An energy converting device comprising the combination with a plurality of conducting members, of a plurality of dielectric members adjacent the said conducting members, but spaced therefrom, the said dielectric members being in form of films, the said films having a superficial oxidized coating upon the surfaces of the said films.

10. An energy converting device comprising a plurality of conducting surfaces, of a plurality of dielectric surfaces alternating with the said conducting surfaces, but spaced therefrom, the faces of the said dielectric surfaces being superficially oxidized.

11. An energy converting device comprising the combination with a plurality of conducting plates, of a plurality of dielectric films alternating with the said conducting plates, but spaced apart therefrom, the surfaces of the said dielectric film being superficially oxidized to a depth not exceeding five microns.

12. An energy converting device comprising the combination with a plurality of conducting plates adapted to form an electrode for connecting to a source of high potential, of a plurality of dielectric films disposed adjacent to said conducting plates, the said conducting plates being sandwiched between the said films but spaced apart therefrom, the said films having their surfaces superficially oxidized to a depth not exceeding five microns, the said films being adapted to form an electrode suitable for connection to the other pole of the source of high potential.

In testimony whereof, I have signed my name to this specification.

ABRAHAM JOFFÉ.